United States Patent
Kim et al.

(10) Patent No.: US 6,944,149 B1
(45) Date of Patent: Sep. 13, 2005

(54) APPARATUS AND METHOD OR SEARCHING FOR PN SEQUENCE PHASE IN MULTI-CARRIER CDMA MOBILE COMMUNICATION SYSTEM

(75) Inventors: Sang-Burn Kim, Songnam-shi (KR); Hye-Jeong Kim, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 09/405,328

(22) Filed: Sep. 24, 1999

(30) Foreign Application Priority Data

Sep. 24, 1998 (KR) ................................ 1998-39747

(51) Int. Cl.[7] .............................................. H04J 3/24

(52) U.S. Cl. .................... 370/349; 370/367; 370/145; 370/329; 455/450

(58) Field of Search ................................ 370/514, 515, 370/342, 349, 367, 145, 329; 375/145, 349, 375/367, 137; 455/450

(56) References Cited

U.S. PATENT DOCUMENTS

| | | | | |
|---|---|---|---|---|
| 5,490,165 | A | * | 2/1996 | Blakeney, II et al. ....... 375/205 |
| 5,867,527 | A | * | 2/1999 | Ziv et al. ..................... 375/208 |
| 5,995,537 | A | * | 11/1999 | Kondo ......................... 375/208 |
| 6,175,561 | B1 | * | 1/2001 | Storm et al. ................. 370/342 |
| 6,263,010 | B1 | * | 7/2001 | Naruse et al. .............. 375/130 |
| 6,633,600 | B2 | * | 10/2003 | Lomp et al. ................. 370/329 |
| 6,760,366 | B1 | * | 7/2004 | Wheatley et al. ........... 370/341 |

* cited by examiner

*Primary Examiner*—Edward F. Urban
*Assistant Examiner*—Lana Le
(74) *Attorney, Agent, or Firm*—Dilworth & Barrese LLP

(57) ABSTRACT

A PN sequence phase searching apparatus in a multi-carrier CDMA mobile communication system. At least two PN sequence phase searchers search for the PN sequence phase of one of at least two different band input signals on different assigned search conditions and output PN phase and energy information. A controller assigns the different search conditions to the PN sequence phase searchers and determines a minimum phase variation period based on the PN phase and energy information received from the PN sequence phase searchers.

14 Claims, 10 Drawing Sheets

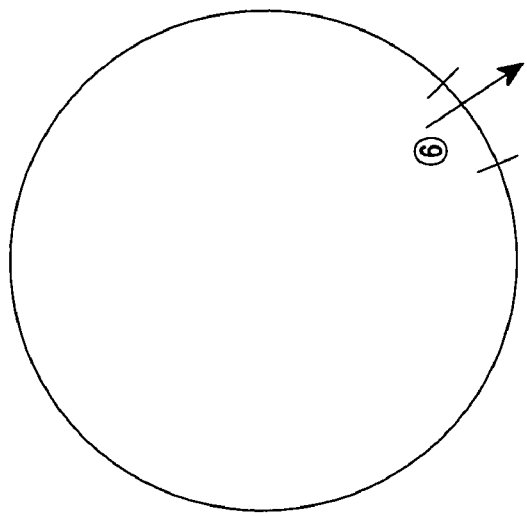
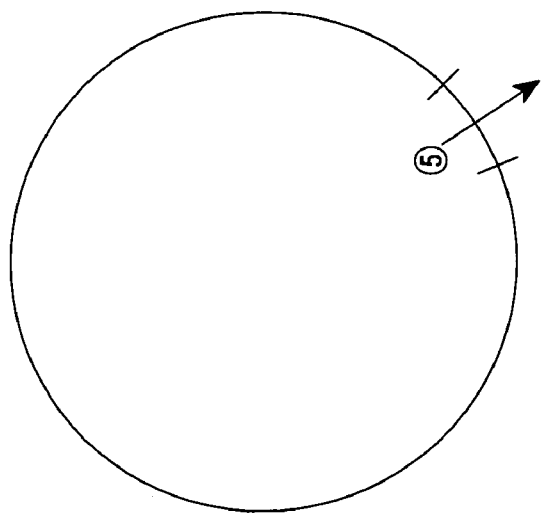
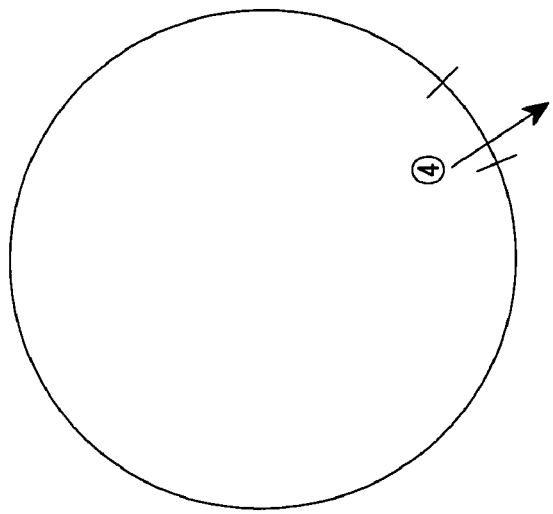
FIG.9B

APPARATUS AND METHOD OR SEARCHING FOR PN SEQUENCE PHASE IN MULTI-CARRIER CDMA MOBILE COMMUNICATION SYSTEM

BACKGROUND OF THE INVENTION

1. Field of the Invention

The present invention relates generally to an apparatus and a method of searching for a PN (Pseudo-random Noise) sequence phase in a CDMA (Code Division Multiple Access) mobile communication system, and in particular, to an apparatus and a method of searching for a PN sequence phase in a CDMA mobile communication system using a multi-carrier.

2. Description of the Related Art

The CDMA mobile communication system has been developed from transmission/reception of voice signal to IMT-2000 which can afford transmission of data at high speed as well as voice transmission. The objectives of IMT-2000 are the transmission of high quality voice data and moving pictures, and high speed internet browsing, etc. A multi-carrier scheme has been suggested for an IMT-2000 system in which intended information is transmitted over a plurality of carriers. The multi-carrier scheme is a process of modulating information spread by the same PN sequence with different carriers prior to transmission.

A transmitter in a multi-carrier CDMA system converts an information signal to a plurality of parallel signals and multiplies the parallel signals by a PN sequence, for spreading. Then, the transmitter multiplies each of the spread signals by different local carriers for modulation. Thus, data is transmitted in different bands. When the transmitter converts the information signal to parallel signals, the information signal is separated into a plurality of band signals in a base band and converted to an RF signal by multiplying the band signals by a predetermined single carrier corresponding to a central frequency. A receiver demodulates the information signal by multiplying each band signal by a corresponding local carrier.

A base station (BS) in the multi-carrier CDMA system transmits pilot signal modulated by PN sequence with its own PN phase offset. The MSs search for the respective PN sequence phases of the multi-carrier signals in a serial search scheme or a parallel search scheme.

When power is on, an MS acquires a pilot channel. The MS performs an initial PN sequence phase search by satisfying a critical condition with respect to the starting points of a BS-generated PN sequence and an autonomously initiated PN sequence. If a call drop occurs, and PN reacquisition is required, the MS resumes the PN sequence phase search.

FIG. 1 illustrates an example of a PN sequence phase searcher using a serial search scheme in a CDMA mobile communication system.

Referring to FIG. 1, a controller 170 provides an overall control to the PN sequence phase searcher. Controller 170 also controls various parameters including an integration period, a window size, and an asynchronous accumulation period, and controls the phase transition of a PN sequence generated from a PN code generator 160. A signal input to the PN sequence phase searcher can be an RF-processed signal, i.e. down-converted, digitized, and applied through a modem chip at a mobile station. Here, the input signal includes a PN sequence generated by a specific BS.

A despreader 110 multiplies the signal received at a specific time point by the PN sequence received from PN code generator 160 to despread the signal. The starting point at which to search for the phase of the BS-generated PN sequence is preset. For example, the phase search starting point can be a PN offset '0'.

A synchronization accumulator 120 accumulates the output of despreader 110 for a corresponding integration period. An energy calculator 130 calculates a detection energy from the accumulated value according to the correlation between the BS-generated PN sequence and the MS-generated PN sequence. A comparator 140 compares energies each other and outputs max 4 energies and its PN phase. Controller 170 controls the phase transition of the PN sequence generated from PN code generator 160. If a reliable PN sequence phase, satisfying a predetermined condition, is acquired, an exterior controller 150 notifies an upper processor (not shown) of the acquired PN sequence phase. Then, the MS demodulates the signals received on a sync channel and a paging channel.

After the PN sequence phase search, controller 150 receives corresponding pilot offset information from the upper processor and controls various parameters of the receiver so that it can measure the reception strength of a pilot signal transmitted from an adjacent BS and compares it with the reception strength of a pilot signal in current service. This is called set management.

An MS manages information about the current BS at which the MS registers and other BSs. The MS receives an adjacent BS list message including the PN offset information of each BS on paging channels, measures the strength of a pilot signal received from each adjacent BS, and uses the measurement as a basis for determining a handoff. That is, the MS manages an active set, a neighbor set, and a candidate set. The active set corresponds to a BS in current communication the MS, the neighbor set includes BSs which are likely candidates for a handoff, and the candidate set includes BSs which are not in current use for data demodulation but have energy large enough for data demodulation.

FIG. 2 is a block diagram of another example of serial PN sequence phase searcher in a CDMA mobile communication system.

Referring to FIG. 2, multipliers 202 and 206 in a carrier demodulator 210 multiply an input signal by local carriers cos $w_c t$ and sin $w_c t$, respectively, so that the input signal is demodulated to an in-phase signal I and a quadrature-phase signal Q. Matched filters 204 and 208 recover the waveforms of the signals I and Q, while a despreader 220 despreads the recovered signals I and Q by an I-arm PN code and a Q-arm PN code received from a PN code generator (not shown). Integrators 225 and 255 accumulate the despread signals I and Q for a predetermined integration period. Energy detectors 230 and 260 square the sums and calculate detection energies based on the correlation between a BS-generated PN code and an MS-generated PN code. An adder 235 adds the outputs of energy detectors 230 and 260. A comparator 240 compares the calculated detection energy with a threshold detection energy. A controller 250 feeds a corresponding PN phase control signal to the PN code generator according to the comparison result.

As described above, an MS can search for the PN sequence phase of a multi-carrier signal received from a BS using a serial search scheme or a parallel search scheme in a multi-carrier CDMA mobile communication system.

However, if the PN phases of different band signals are to be searched serially in the multi-carrier CDMA mobile communication system, a single serial PN sequence phase searcher should concurrently search a plurality of PN sequences (e.g., three PN sequences), thereby increasing time required for the PN sequence phase search and set management and remarkably decreasing reception performance. In particular, upon occurrence of a handoff, the single serial PN sequence phase searcher cannot rapidly cope with a channel change rate in a rapid channel changing environment. As a result, a call drop is more likely to occur.

This problem can be solved either by increasing the speed of a serial PN sequence phase searcher or by using a parallel PN sequence phase searcher. When serially searching for the PN sequence phases of different band signals in the multi-carrier CDMA mobile communication system, the single serial PN sequence phase searcher can operate at a rate N times higher (N is the number of the received band signals). For example, in a 3-band CDMA communication system, a 24xPN sequence phase searcher can be used instead of an 8xPN sequence phase searcher. The 24xPN sequence phase searcher can process a 3-band PN sequence but is difficult to achieve because of remarkably increased complexity in designing hardware.

A PN sequence phase searcher based on a parallel search scheme can be achieved by connecting serial PN sequence phase searchers as shown in FIG. 2 in parallel. Each PN sequence phase searcher searches for the phase of the PN sequence of a corresponding signal among multi-band input signals. If each PN sequence phase searcher performs a PN sequence phase search on a corresponding band input signal generated by a specific BS at the same search starting point, it implies that the same hypothesis at each band is subject to the PN sequence phase search. Therefore, the time required for the PN sequence phase search is almost equal to that in the serial search scheme. Since the performance of a PN sequence phase searcher is evaluated according to its capability of reducing an average search time, a method of reducing the average search time should be explored before applying the parallel search scheme to the multi-carrier CDMA mobile communication system.

Each BS has a unique pilot PN offset for identifying the BS in a CDMA mobile communication system. In the multi-carrier system, different carrier input signals or different band input signals transmitted by a specific BS have the same pilot PN offset. However, the band signals are not set in the same fading environment in view of the nature of a mobile communication environment. Therefore, the BS loads the same pilot signal on each band or carrier signal for transmission, so that an MS can search for the PN sequence phases of all band signals or all carrier signals.

Therefore, if each serial PN sequence phase searcher in the parallel search scheme performs a PN sequence phase search by generating a PN sequence at a different phase search starting point, the average of the PN sequence phase search time can be reduced. For example, to search a PN sequence with 32768 hypotheses, the 32768 hypotheses are divided into N, N being the number of the serial PN sequence searchers where each serial PN sequence searcher generates a PN code at the phase point of a corresponding segment. Thus, the time required for a PN sequence phase search can be reduced by N times.

Though the PN offset of a BS in the multi-carrier CDMA mobile communication system is the same in each band signal transmitted by the BS, a fading influence and a multi-path characteristic are different in each band. That is, there is no guarantee that each band signal received at an MS has the same PN sequence phase. Therefore, the multi-carrier CDMA mobile communication system should perform a PN sequence phase search on each of different band input signals.

When a specific serial PN sequence searcher completes a PN sequence phase search satisfying a predetermined condition, and a minimum PN sequence phase variation range is determined, other PN sequence phase searchers are searching for the PN sequence phases of their respective band input signals using different search conditions. The PN sequence phases of the other band input signals will be within the minimum phase variation period. Since each PN sequence phase searcher operates on a different search condition until the minimum phase variation period is determined, the average of PN sequence phase search times is reduced. Since the initial stage consumes most of the PN sequence phase search time, the PN sequence phase search time can be reduced by a factor of ½ or ⅓.

After the minimum PN sequence phase variation range is determined, each PN sequence phase searcher should implement a PN sequence phase search in the minimum phase variation period.

SUMMARY OF THE INVENTION

It is, therefore, an object of the present invention to provide an apparatus and a method of searching for a PN sequence phase in a multi-carrier CDMA mobile communication system.

It is another object of the present invention to provide a PN sequence phase searching apparatus and a method in a multi-carrier CDMA mobile communication system, where each PN sequence phase searcher searches for the PN sequence phase of one of received signals from each band on a different search condition and a minimum PN sequence phase variation range is determined, to thereby reduce an average PN sequence phase search time.

It is a further object of the present invention to provide a PN sequence phase searching apparatus and method in a multi-carrier CDMA mobile communication system, where at least two PN sequence phase searchers search for the PN sequence phase of one of at least two band signals on different search conditions and output PN phase and energy information, and a controller assigns the different search conditions to the PN sequence phase searchers and determines a minimum phase variation period based on the PN phase and energy information.

It is still another object of the present invention to provide a PN sequence phase searching apparatus and method in a multi-carrier CDMA mobile communication system, where at least two PN sequence phase searchers search for the PN sequence phase of one of at least two band signals on different search conditions and output PN phase and energy information, a controller assigns the different search conditions to the PN sequence phase searchers and determines a minimum phase variation period based on the PN phase and energy information, and the at least two PN sequence phase searchers individual searches for the PN sequence phase of assigned (coresponding) band signal in the determined minimum phasevariation period.

It is yet another object of the present invention to provide a PN sequence phase searching apparatus and method in a multi-carrier CDMA mobile communication system, where each PN sequence phase searcher searches for the PN sequence phase of a corresponding band input signal at a different search starting point.

To achieve the above objects, there is provided a PN sequence phase searching apparatus in a multi-carrier CDMA mobile communication system. At least two PN sequence phase searchers search for the PN sequence phase of one of at least two different band input signals using different assigned search conditions and output PN phase and energy information. A controller assigns the different search conditions to the PN sequence phase searchers and determines a minimum phasevariation period based on the PN phase and energy information received from the PN sequence phase searchers.

According to another embodiment of the present invention, the above objects are achieved by providing a PN sequence phase searching method in a multi-carrier CDMA mobile communication system. The PN sequence phase of one of at least two different band input signals is searched for in parallel on different assigned search conditions, PN phase and energy information is output, and a minimum phase variation period is determined based on the PN phase and energy information.

According to a further embodiment of the present invention, the above objects can be achieved by providing a PN sequence phase searching method in a multi-carrier CDMA mobile communication system. The PN sequence phase of one of at least two different band input signals is searched in parallel using different assigned search conditions, information about PN phases and energies is output, the energies are sorted and max energy is compared with a threshold, if the max energy value is higher than the threshold, the PN sequence phase search is performed on new condition based on the energy and its phase, information about PN phase and energies and frequency error is output, the energies is sorted and max energy is compared with a higher threshold and frequency error is compare with a frequency threshold, if max energy is higher than the energy threshold and frequency error is lower than frequency threshold, and a minimum phase variation period is determined based on phase information corresponding to the energy information if on energy is higher than the threshold.

BRIEF DESCRIPTION OF THE DRAWINGS

The above and other objects, features and advantages of the present invention will become more apparent from the following detailed description when taken in conjunction with the accompanying drawings in which:

FIGS. 9A and 9B illustrate the first embodiment of the PN sequence phase search in the multi-carrier CDMA mobile communication system according to the present invention.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

In a multi-carrier CDMA mobile communication system employing a parallel PN sequence search scheme, a plurality of PN sequence phase searchers are assigned one of two signals received in different bands and search for the PN sequence phase of the band signal using different search conditions. Here, the different search conditions may include a phase corresponding to a search starting point and a search period. Hence, each serial PN sequence phase searcher can generate a PN sequence and search for a PN sequence phase at a different search starting point. Therefore, the average PN sequence search time is reduced.

The concept of a PN circle will first be described as background to help understand the present invention. A transmitter in a CDMA mobile communication system multiplies an information signal by a PN sequence of a high data rate prior to transmission. Then, a receiver acquires the PN sequence synchronization of the transmitter, multiplies a received signal by the PN sequence for despreading, and recovers the information signal. A channel-encoded random data signal or symbol is orthogonally spread by a corresponding orthogonal code for data transmission and spread by a PN sequence at a transmission rate 1.2288 MHz. A pilot signal is generated by orthogonally spreading an undemodulated signal being all "+1"s spread by an orthogonal code $W_0$ and spreading the orthogonally spread signal by a PN sequence.

A PN sequence can be of period $2_{15}-1$ and "1" or "−1" occurs with the same frequency in the PN sequence. Each BS has a unique PN sequence phase starting point and an MS searches the PN sequence of a pilot signal to synchronize with the BS. A PN sequence with period 32768 is generally expressed as a PN circle.

Figure 3:
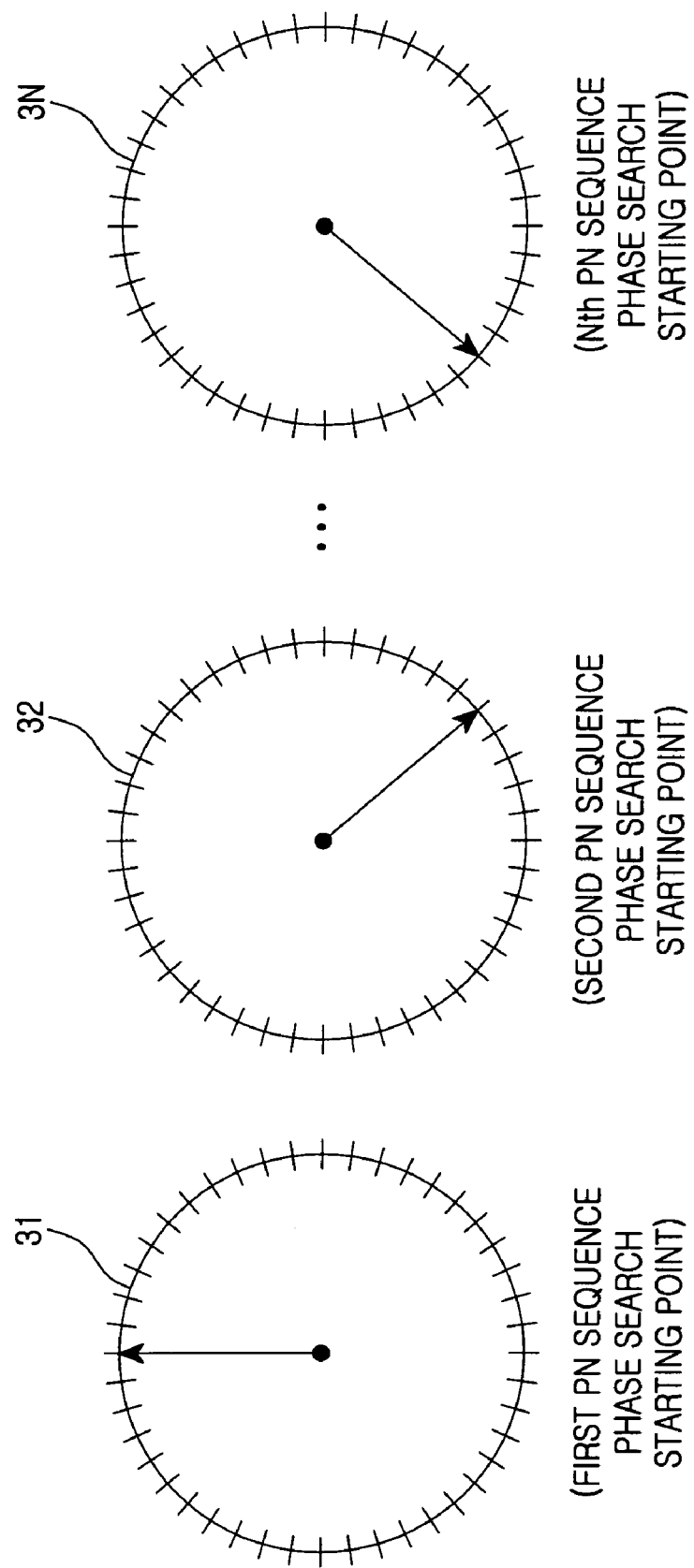
FIG. 3 illustrates examples of different search starting points of N serial PN sequence phase searchers in a multi-carrier CDMA mobile communication system according to the present invention.

FIG. 3 illustrates an example of different search starting points of N serial PN sequence phase searchers in a multi-carrier CDMA mobile communication system according to the present invention.

Here, each scale in PN circles 31 to 3N represents a PN sequence phase and the interval of scales corresponds to a PN chip duration. The arrow in each PN circle indicates a different search starting point, namely, a different PN sequence phase assigned to each PN sequence phase searcher. Each PN circle is divided into N according to the embodiments of the present invention.

Figure 4:
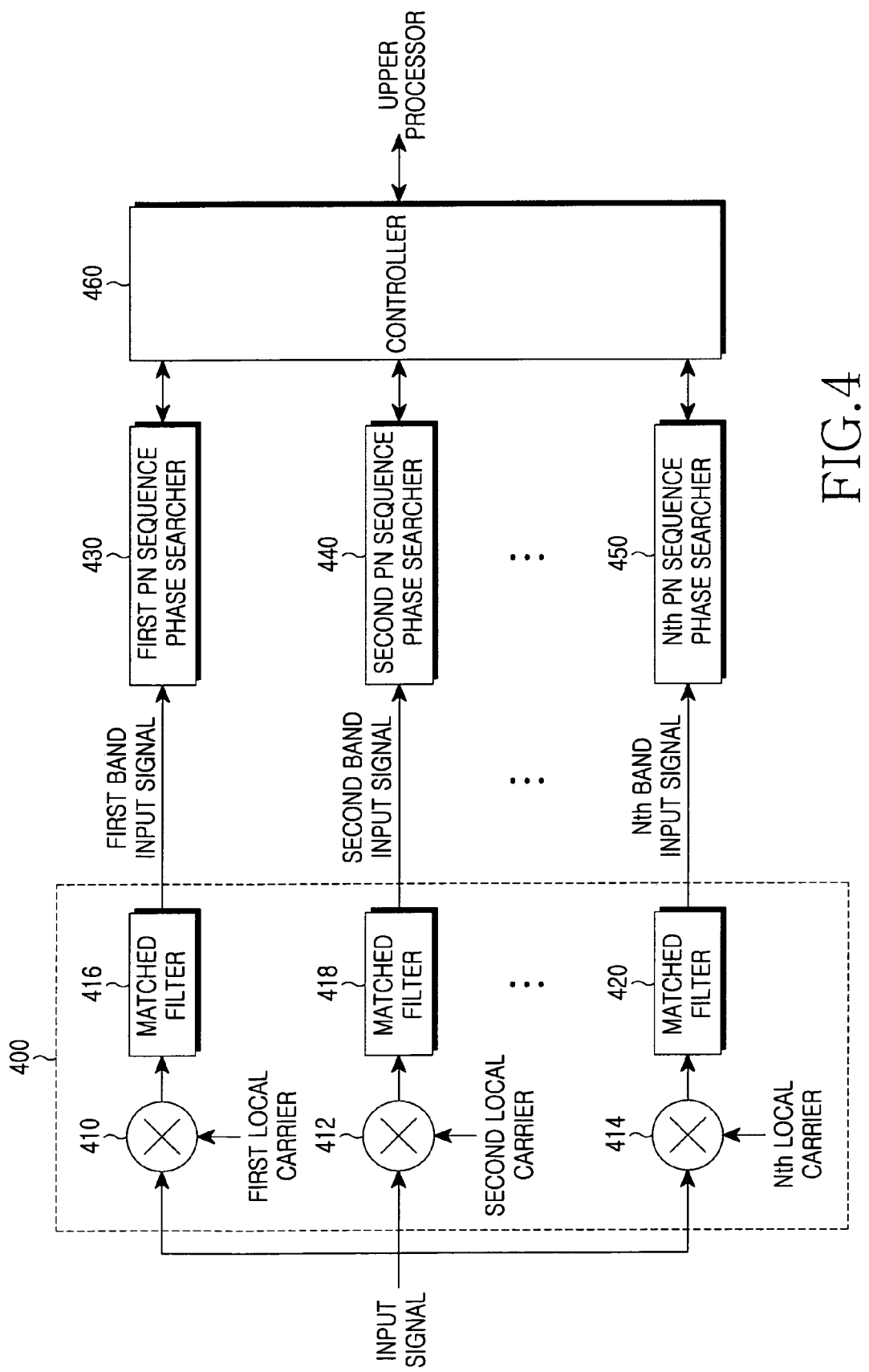
FIG. 4 is a block diagram of an embodiment of a PN sequence phase searching apparatus in the multi-carrier CDMA mobile communication system according to the present invention.

FIG. 4 is a block diagram of an embodiment of a PN sequence phase searching apparatus in a multi-carrier CDMA mobile communication system according to the present invention.

Referring to FIG. 4, a carrier demodulator 400 demodulates RF carrier demodulated input signal. First to Nth multipliers 410, 412, and 114 in the carrier demodulator 400 receive RF carrier demodulated signal and multiply them by first to Nth local carriers, thereby demodulating each band signals. Matched filters 416, 418, and 420 in the carrier demodulator 400 recover the waveforms of the demodulated band signals.

Figure 1:
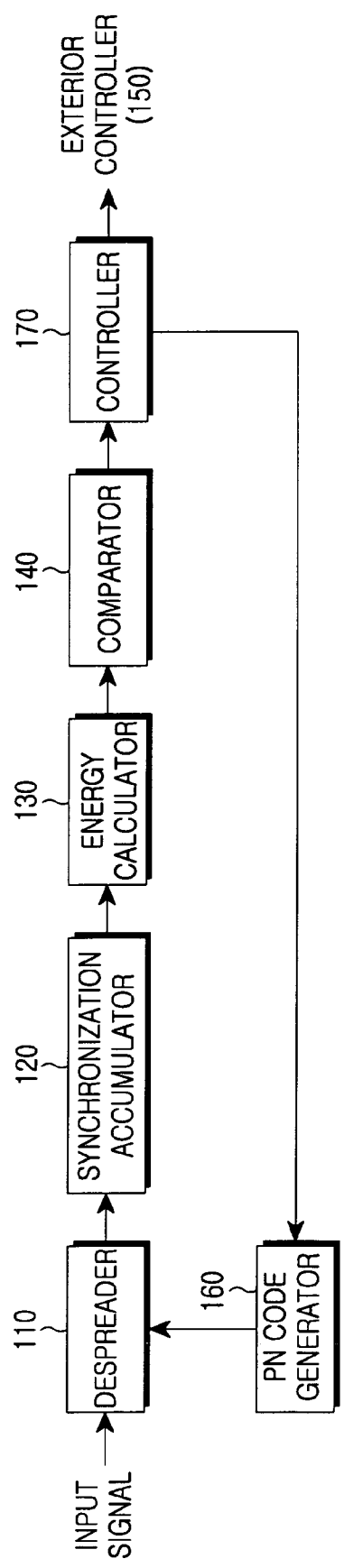
FIG. 1 is a block diagram of an example of a serial PN sequence phase searcher in a CDMA mobile communication system.
Figure 2:
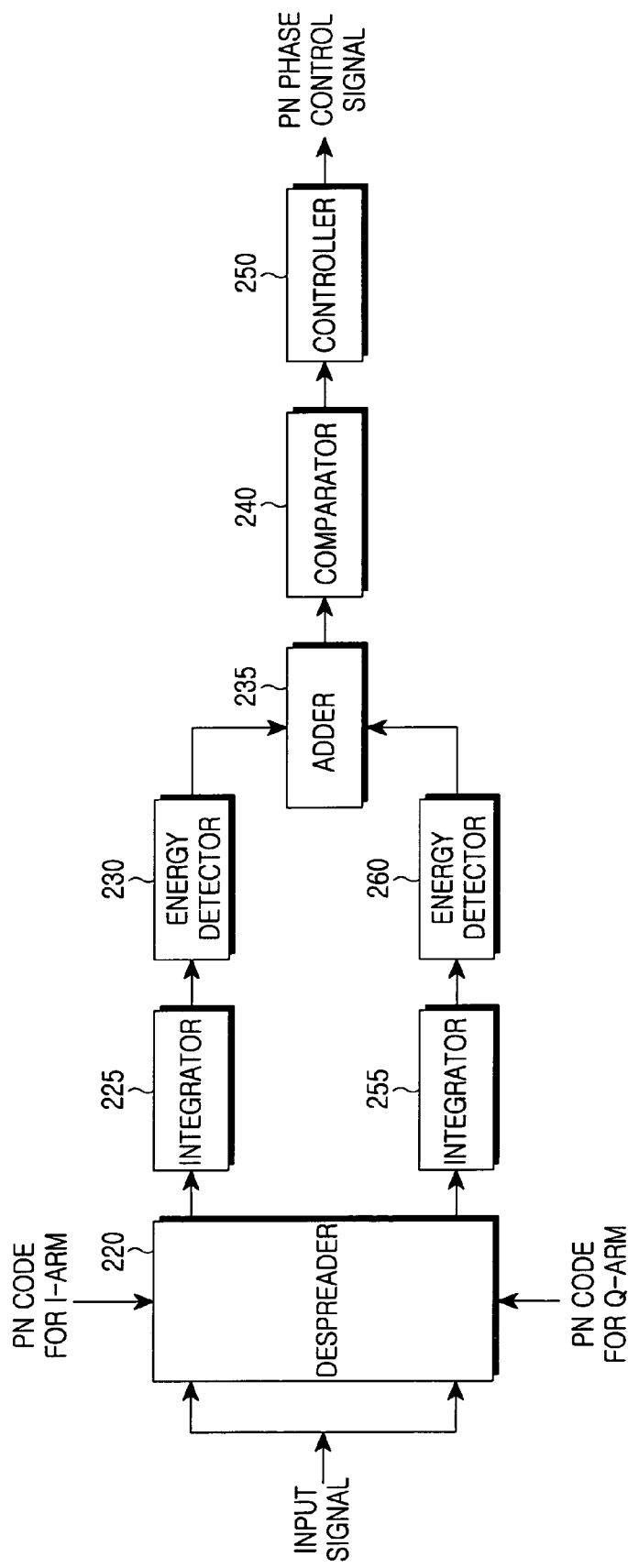
FIG. 2 is a block diagram of another example of the serial PN sequence phase searcher in the CDMA mobile communication system.

First to Nth PN sequence phase searchers 430, 440, and 450, configured as shown in FIG. 1 or FIG. 2, search for PN sequence phases of the first to Nth band signals on different search conditions assigned by the control of a controller 460 and output information about PN phases and energies. Here, the different search conditions can be PN phases and search periods corresponding to different search starting points. In addition, the first to Nth PN sequence phase searchers 430, 440, and 450 can search for the PN sequence phases at different search starting points according to the different search conditions.

The controller 460 controls the operations of the first to Nth PN sequence phase searchers 430, 440, and 450 by controlling and assigning corresponding search conditions based on the PN phase and energy information received from the first to Nth PN sequence phase searchers 430, 440, and 450.

The controller 460 receives the PN phase and energy information, assigns the corresponding search conditions, and determines a minimum phasevariation period in a predetermined PN sequence phase search algorithm. Then, to search for the PN sequence phase of a corresponding band input signal, the information of the minimum phase variation period is shared by all the PN sequence phase searchers. Thus, the first to Nth PN sequence phase searchers 430, 440, and 450 perform an individual PN sequence phase search for each assigned (corresponding) band signal within the minimum phasevariation period.

If a PN phase is acquired in the minimum phasevariation period, the controller 460 notifies an upper processor (not shown) of the PN phase acquisition. Thus, an MS (not shown) demodulates sync channel in next stages. After the PN sequence phase search, the controller 460 receives corresponding pilot offset information from the upper processor, controls corresponding search conditions, measures the strengths of pilot signals received from adjacent BSs, and compares them with the strength of a pilot signal in current service.

Meanwhile, the max energies received from the PN sequence phase searchers 430, 440, and 450 satisfy a threshold, the controller 460 assigns new corresponding search conditions which include new energy threshold higher than former threshold, a frequency error threshold, a newly defined search window size and search starting point based on PN phase with max energy, correlation period, etc. to PN sequence phase searchers satisfying the threshold, and perform the PN sequence phase search with the new search condition; and if max energy and frequency error satisfy the corresponding thresholds, repeat the same process as in the prior case the predefined number of times for higher stability and lower probability of false alarm. If there's a PN phase which satisfies all of the conditions, the controller 460 determines a minimum phase variation period according to the PN phase and controls the minimum phase variation period to be shared by all the PN sequence phase searchers. The threshold becomes more strict stage by stage.

If max energy or frequency error does not satisfy the thresholds at any stage, the controller 460 assigns another search condition which include another search window size and starting point to the PN sequence phase searchers 430, 440, and 450 which does not satisfy a threshold and resume PN phase search.

The stability can be raised and the false alarm probability can be further reduced, if search repetition time is more and controller use appropriate conditions.

While each PN sequence phase searcher searches for the PN sequence phase of its corresponding band input signal until the minimum phase variation period is determined in the embodiment of FIG. 4, it is a mere exemplary application. It can be further contemplated that each PN sequence phase searcher searches for the PN sequence phase of a specific band input signal on a different search condition until the minimum phase variation period is determined. After the determination of the minimum phase variation period, each PN sequence phase searcher should search again for the PN sequence phase of its corresponding band input signal.

Figure 5:
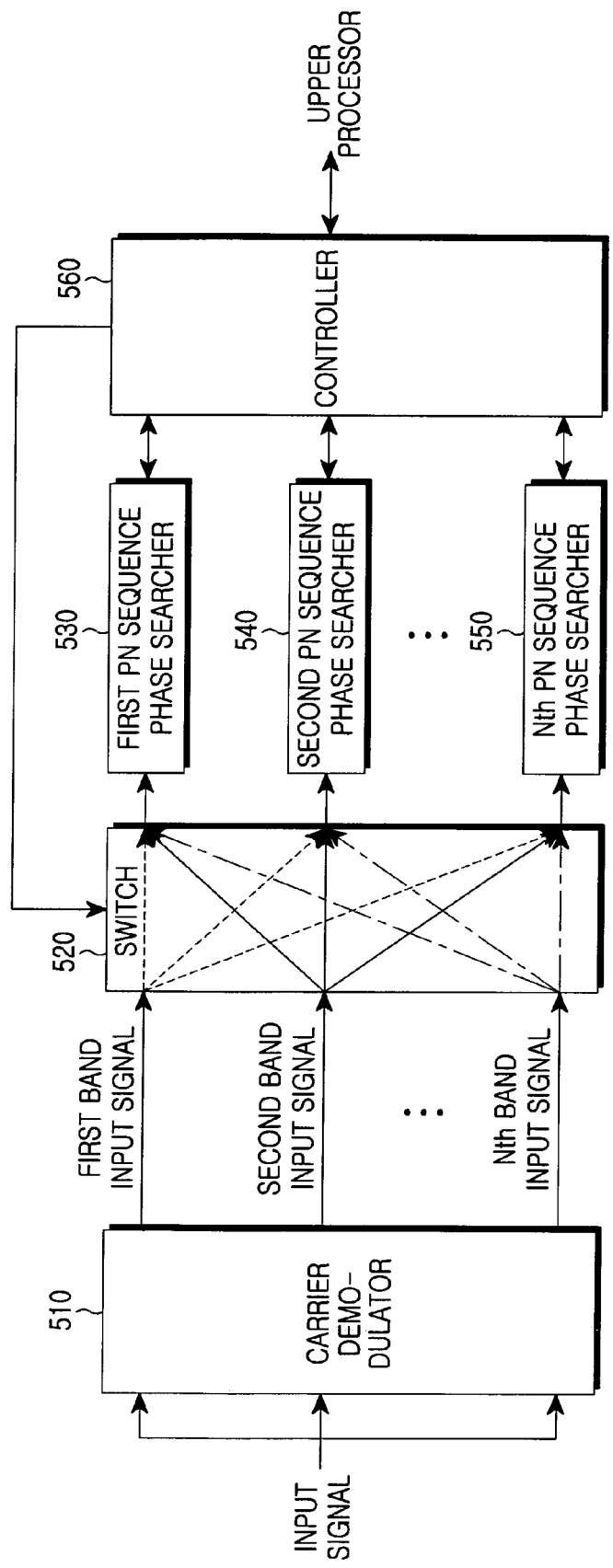
FIG. 5 is a block diagram of another embodiment of the PN sequence phase searching apparatus in the multi-carrier CDMA mobile communication system according to the present invention.

FIG. 5 is a block diagram of another embodiment of the PN sequence phase searching apparatus in the multi-carrier CDMA mobile communication system according to the present invention.

Referring to FIG. 5, a carrier demodulator 510 demodulates the input signal into first to Nth band input signals. First to Nth searchers 530, 540, and 550, configured as shown in FIG. 1, search for the PN sequence phase of one of first to Nth band signals received from a switch 520, using different search conditions and output information about PN phases and energies. Here, the different search conditions can be PN phases and search periods corresponding to search starting points. In addition, the first to Nth PN sequence phase searchers 530, 540, and 550 can perform the PN sequence phase search from different search starting points according to the different search conditions.

The controller 560 controls the operations of the first to Nth PN sequence phase searchers 530, 540, and 550 by controlling and assigning corresponding search conditions based on the PN phase and energy information received from the first to Nth PN sequence phase searchers 530, 540, and 550.

The controller 560 receives the PN phase and energy information, assigns the corresponding search conditions, and determines a minimum phase variation period in a predetermined PN sequence phase search algorithm. Then, to search for the PN sequence phase of a corresponding band input signal, the information of the minimum phase variation period is shared by all the PN sequence phase searchers. Thus, the first to Nth PN sequence phase searchers 530, 540, and 550 perform a PN sequence phase search on their respective band signals within the minimum phase variation period.

If a PN phase is acquired in the minimum phase variation period, the controller 560 notifies an upper processor (not shown) of the PN phase acquisition. Thus, an MS (not shown) demodulates sync and paging channels in next stages.

The switch 520 switches one of the first to Nth band input signals to the input terminal of a corresponding PN sequence phase searcher under the control of the controller 560 until the minimum phase variation period is determined. After the determination of the minimum phase variation period, the switch 520 switches the first to Nth band input signals to the input terminals of the first and Nth corresponding PN sequence phase searchers under the control of the controller 560.

Figure 6:
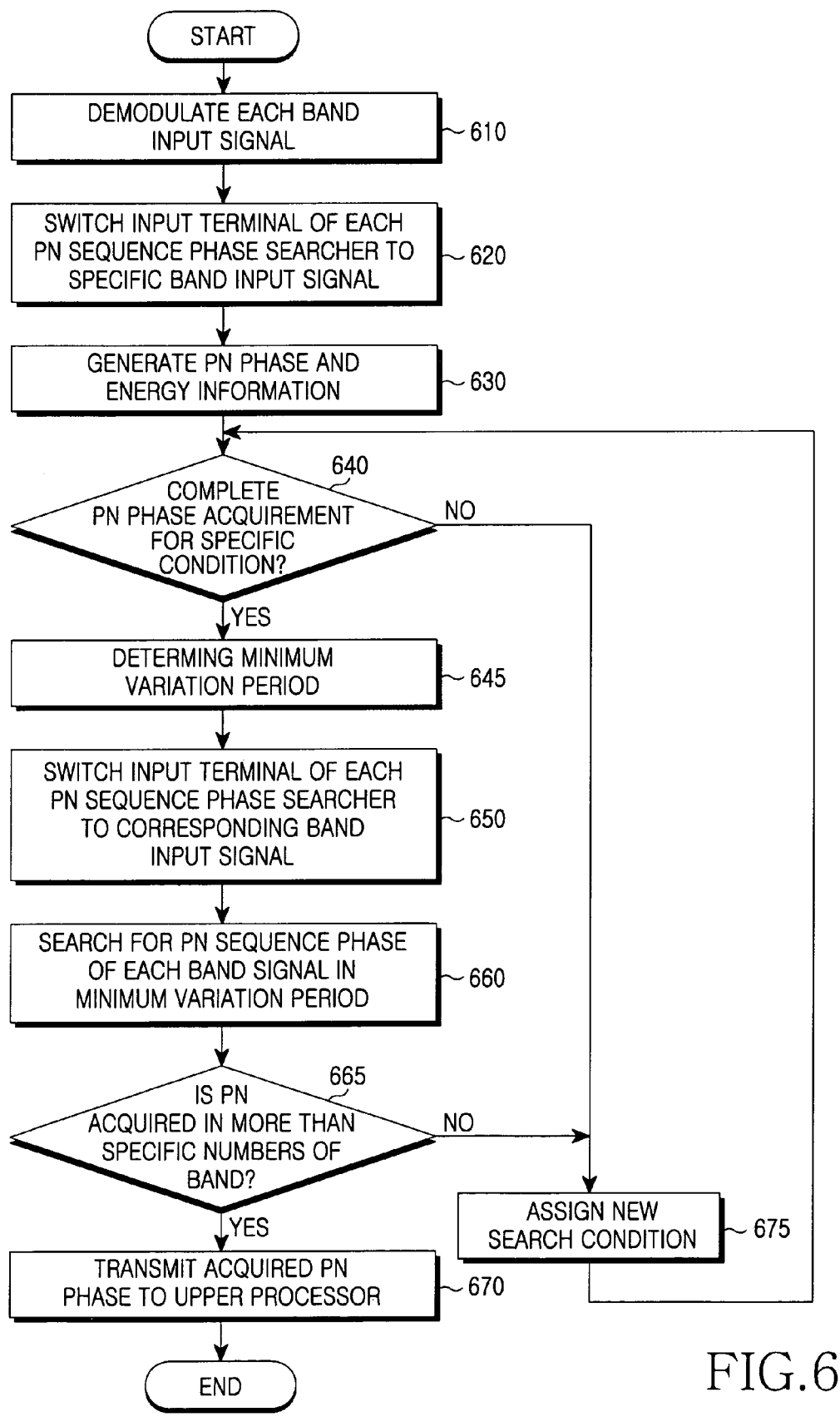
FIG. 6 is a flowchart depicting an embodiment of the parallel PN sequence phase search in the multi-carrier CDMA mobile communication system.

FIG. 6 is a flowchart depicting an embodiment of a PN sequence phase search in a multi-carrier CDMA mobile communication system according to the present invention.

Referring to FIG. 6, the carrier demodulator 510 demodulates each band input signal in step 610 and the switch 520 switches a specific band input signal to the input terminals of the first to Nth PN sequence phase searchers 530, 540, and 550 in step 620. In step 630, each PN sequence phase searcher searches for the PN sequence phase of the specific band signal on a different search condition assigned by the controller 560 and outputs information about a corresponding PN phase and energy. The controller 560 determines a minimum phase variation period in step 645 and the switch 520 switches the first to Nth band input signals to the input terminals of the first to Nth corresponding PN sequence phase searchers 530, 540, and 550 under the control of the controller 560 in step 650. In step 660, each PN sequence phase searcher searches for the PN sequence phase of its corresponding band signal on a search condition corresponding the minimum phase variation period, assigned by the controller 560, within the minimum phase variation period. Step 665 determines whether or not the PN has been acquired in more than the specific numbers of bands. If yes, the controller 560 transmits information about an acquired PN phase in each band to the upper processor in step 670. If no, step 675 assigns new search condition and returns to step 640.

Meanwhile, the multi-carrier CDMA mobile communication system should support compatibility with a conventional single-carrier CDMA mobile communication system. For example, a user can switch an MS operational mode according to a current service type supported by the system, that is, according to whether a multi-carrier mode or a single carrier mode is supported. If an MS set to a multi-carrier mode travels into a service area supporting a single carrier mode or power is on in the service area, the MS is automatically switched to the single carrier mode.

Therefore, the parallel PN sequence phase searching apparatus should also perform a PN sequence phase search on a single carrier or single band signal. If each PN sequence phase searcher searches for the PN sequence phase of the single band signal at different search starting points, time required for the PN sequence search is reduced.

Figure 7:
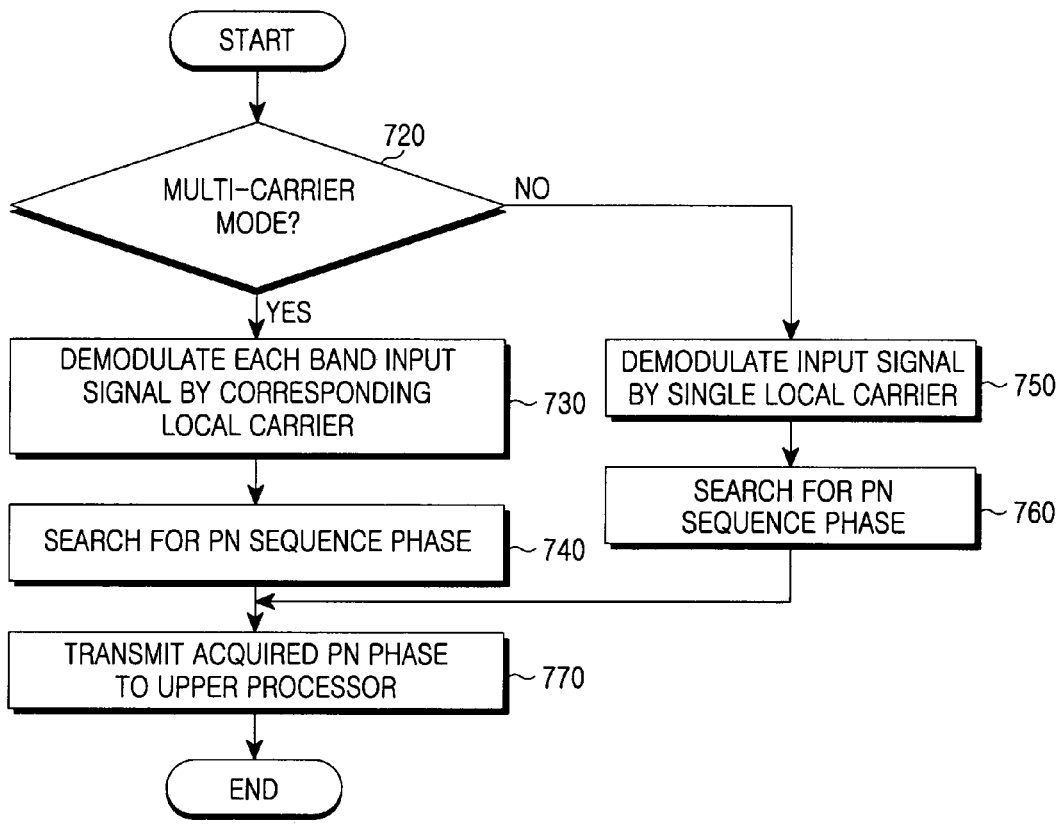
FIG. 7 is a flowchart depicting a third embodiment of the parallel PN sequence phase search in the multi-carrier CDMA mobile communication system.

FIG. 7 is a flowchart depicting a third embodiment of the PN sequence phase search in the multi-carrier CDMA mobile communication system.

Referring to FIGS. 5 and 7, the controller 460 determines whether the MS is set to a multi-carrier mode or a single carrier mode in step 720. The determination can be made based on information about the MS operating mode received from the upper processor or information about whether a handoff to another mode is needed or not.

At the multi-carrier mode, the carrier demodulator 400 demodulates each band signal by a corresponding local carrier under the control of the controller 460 or the upper processor in step 730. Each PN sequence phase searcher searches for the PN sequence phase of a corresponding band signal at a different search point under the control of the controller 460 in step 740.

At the single carrier mode, the carrier demodulator 400 demodulates the received signal by a single local carrier under the control of the controller 460 or the upper processor in step 750. Then, the single band signal is applied to the input of each PN sequence phase searcher. In step 760, each PN sequence phase searcher searches for the PN sequence phase of the single band signal at a different search starting point under the control of the controller 460. The controller 460 transmits the acquired corresponding PN phase information to the upper processor in step 770.

Figure 8A:
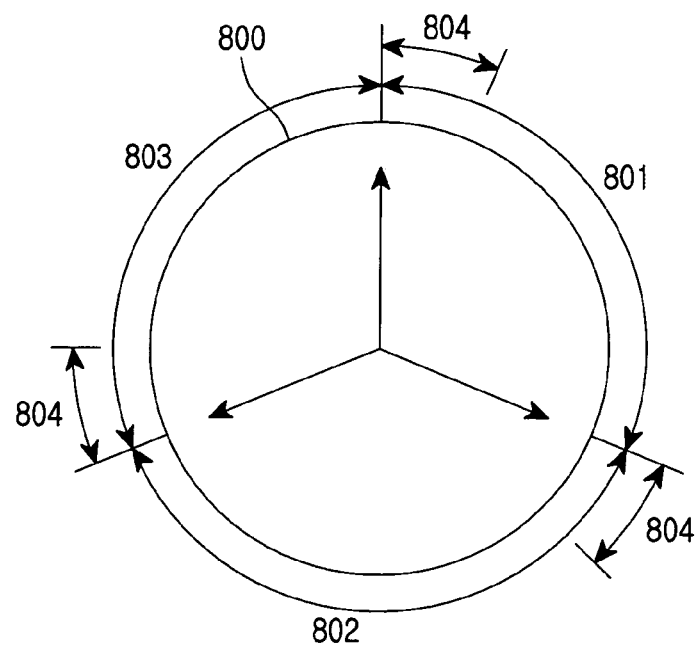
FIG. 8A illustrates an example of different starting points of PN sequence phase searchers in the multi-carrier CDMA mobile communication system according to the present invention.

FIG. 8A illustrates an example of different search points of PN sequence phase searchers in a multi-carrier CDMA mobile communication system according to the present invention.

In FIG. 8A, shows a PN circle 800 with three PN sequence phase searchers 801, 802, and 803. PN circle 800 is divided into three segments, and each PN sequence phase searcher is assigned to a corresponding search starting point. Each PN sequence phase searcher receives a single band signal and searches for the PN sequence phase of the single band signal by setting a search window 804 from the corresponding search starting point.

Figure 8B:
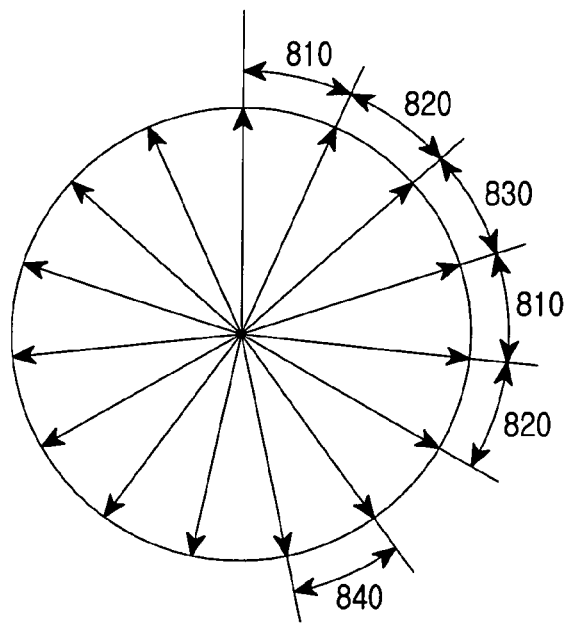
FIG. 8B illustrates another example of different starting points of PN sequence phase searchers in the multi-carrier CDMA mobile communication system according to the present invention.

FIG. 8B illustrates another example of different search points of PN sequence phase searchers in the multi-carrier CDMA mobile communication system according to the present invention.

In FIG. 8B, it is assumed that the number of PN sequence phase searchers is three, a PN circle, that is, a PN sequence is divided into predetermined search periods 840, starting from a PN offset '0', and then the divided search periods are sequentially assigned to the PN sequence phase searchers, 810, 820, and 830.

Figure 9A:
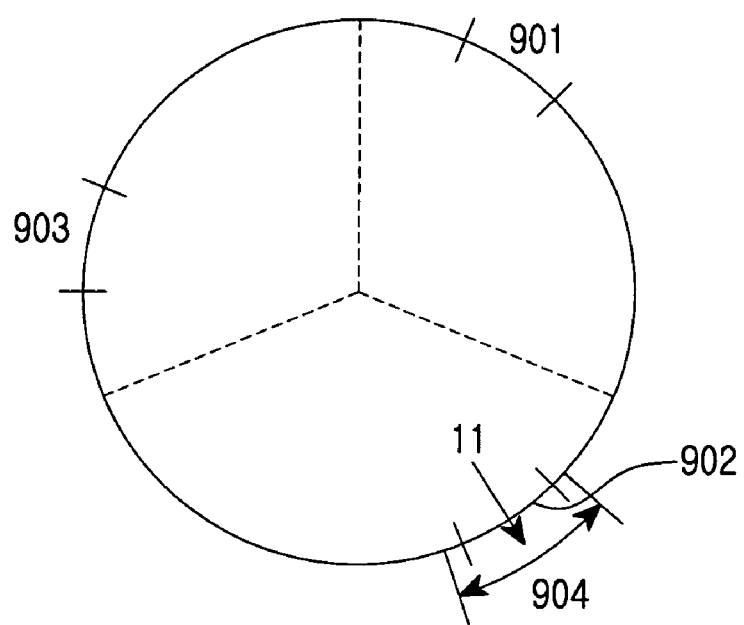

FIGS. 9A and 9B illustrate the first embodiment of the PN sequence phase search in the multi-carrier CDMA mobile communication system according to the present invention.

FIG. 9A illustrates a procedure in which information about a PN phase and energy corresponding to a minimum phase variation period indicated by reference numeral 11 is output while each PN sequence phase searcher, a first, a second, and a third, respectively 901, 902, and 903, searches for a specific band signal, for example, a second band signal on a different condition, and the controller determines the minimum phase variation period.

FIG. 9B illustrates a procedure in which the controller determines the minimum phase variation period and provides information about the minimum phase variation period to the first to third PN sequence phase searchers so that the first to third PN sequence phase searchers search for the PN sequence phases of their corresponding band signals. PN phase 4, 5, 6 in FIG. 9B is the last PN phase acquired from each band signals and used in demodulating sync channel-later.

In a multi-carrier CDMA mobile communication system according to the present invention as described above, each PN sequence phase searcher searches for the PN sequence phase of an input band signal on a different search condition and then a minimum PN phase variation range is determined. Therefore, an average of PN sequence phase search time is reduced. In particular, since most time is consumed in performing an initial stage of the PN sequence phase search, the PN sequence phase search time can be reduced to a half or third of the conventional search time. Furthermore, an initial PN phase acquisition and call recovery time is reduced when power is on at an MS or a call is dropped.

After the minimum phase variation period is determined, the PN sequence phase search is again performed on each band signal. Therefore, a stable PN sequence phase search can be implemented with a reduced false alarm probability on each band input signal which exhibits a different fading influence and a different multi-path characteristic.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A PN sequence phase searching apparatus in a multi-carrier CDMA mobile communication system using the same PN code phase values, comprising:
at least two PN sequence phase searchers for searching for the PN sequence phase of one of at least two different band input signals using different assigned search conditions and for outputting PN phase and energy information; and
a controller for assigning said different search conditions to said at least two PN sequence phase searchers and for determining a minimum phase variation period based on the PN phase and energy information received from said at least two PN sequence phase searchers,
wherein said different search conditions include phases and search periods corresponding to a plurality of PN sequence phase search starting points determined by dividing the entire phase area into a number of sections, and
wherein said at least two PN sequence phase searchers perform a PN sequence phase search within a minimum phase variation period determined by said controller, and
wherein one of said at least two different band input signals is switched to said at least two PN sequence phase searchers at the time point when said different search conditions are assigned and the band input signals are switched to the corresponding PN sequence phase searchers at the time point when the minimum phase variation range is determined, under the control of the controller.

2. The PN sequence phase searching apparatus of claim 1, wherein said plurality of PN sequence phase search starting points in said different search conditions are assigned to said at least two PN sequence phase searchers by dividing a PN sequence by the number of the PN sequence phase searchers.

3. The PN sequence phase searching apparatus of claim 1, wherein said different search conditions are set by dividing a PN sequence into predetermined periods and the divided search periods are sequentially assigned to said at least two PN sequence phase searchers.

4. A PN sequence phase searching method in a multi-carrier CDMA mobile communication system using the same PN code phase values, comprising the steps of:
searching for the PN sequence phase of one of at least two different band input signals in parallel using different assigned search conditions;
outputting PN phase and energy information;
determining a minimum phase variation period based on the PN phase and energy information;
searching for the PN sequence phase of each input signal within the determined minimum phase variation period; and
transmitting PN sequence phases acquired in the search to an upper processor, after the minimum phase variation period determining step,
wherein the different assigned search conditions include phases and search periods corresponding to a plurality of PN sequence phase search starting points determined by dividing the entire phase area into a number of sections, and
wherein said minimum phase variation period is determined by phase information corresponding to the highest energy among the energy information.

5. The PN sequence phase searching method of claim 4, wherein the different search conditions are set by dividing a PN sequence by the number of the parallel PN sequence phase searches and assigning corresponding phases produced by the division as the PN sequence phase search starting points.

6. The PN sequence phase searching method of claim 4, wherein the different search conditions are set by dividing a PN sequence into predetermined periods and the divided search periods are sequentially assigned for the parallel PN sequence phase searches.

7. The PN sequence phase searching method of claim 4, further comprising the steps of:
searching for the PN sequence phase of each input signal within the determined minimum phase variation period; and
transmitting PN sequence phases acquired in the search to an upper processor, after the minimum phase variation period determining step.

8. A PN sequence phase searching method in a multi-carrier CDMA mobile communication system, comprising the steps of:
searching for the PN sequence phase of one of at least two different band input signals in parallel on assigned different search conditions and outputting information about PN phases and energies;
sorting the energies of each searcher and comparing each max energy with a threshold varied with the number of PN sequence phase searches;
assigning new corresponding search conditions to PN sequence phase searchers satisfying the threshold, and perform the PN sequence phase search with the new search condition if max energy satisfy the threshold;
repeat the same process as upper case the predetermined number of times if max energy and frequency error satisfy the corresponding thresholds;
determining a minimum phase variation period based on the PN phase information, if there's a PN phase which satisfy all of the conditions;
assigning another search condition which include another search window size and starting point to the PN sequence phase searchers which does not satisfy a threshold and resume PN phase search if max energy or frequency error does not satisfy the thresholds at any stage.

9. The PN sequence phase searching method of claim 8, wherein the threshold is incremented stage by stage according to the number of the PN sequence phase searches.

10. The PN sequence phase searching method of claim 8, wherein only when an energy higher than the threshold is output, the PN sequence phase search is resumed.

11. The PN sequence phase searching method of claim 8, wherein the different search conditions include phases and search periods corresponding to a plurality of PN sequence phase search starting points.

12. The PN sequence phase searching method of claim 11, wherein the different search conditions are set by dividing a PN sequence by the number of the parallel PN sequence phase searches and assigning corresponding phases produced by the division as the PN sequence phase search starting points.

13. The PN sequence phase searching method of claim 11, wherein the different search conditions are set by dividing a PN sequence into predetermined periods and the divided search periods are sequentially assigned for the parallel PN sequence phase searches.

14. The PN sequence phase searching method of claim 8, further comprising the steps of:
  searching for the PN sequence phase of each input signal within the determined minimum phase variation period; and
  transmitting PN sequence phases acquired in the search to an upper processor, after the minimum phase variation period determining step.

* * * * *

UNITED STATES PATENT AND TRADEMARK OFFICE
CERTIFICATE OF CORRECTION

PATENT NO. : 6,944,149 B1  
DATED : September 13, 2005  
INVENTOR(S) : Sang-Bum Kim et al.

It is certified that error appears in the above-identified patent and that said Letters Patent is hereby corrected as shown below:

<u>Title page, Item [54] and Column 1, lines 1-4,</u>  
Title, APPARATUS AND METHOD OR SEARCHING FOR PN SEQUENCE PHASE IN MULTI-CARRIER CDMA MOBILE COMMUNICATION SYSTEM" should be  
-- APPARATUS AND METHOD OF SEARCHING FOR PN SEQUENCE PHASE IN MULTI-CARRIER CDMA MOBILE COMMUNICATION SYSTEM --.  
Item [75], Inventors, "Sang-Burn Kim" should be -- Sang-Bum Kim --.

Signed and Sealed this

Sixth Day of June, 2006

JON W. DUDAS  
*Director of the United States Patent and Trademark Office*